US012070898B2

(12) United States Patent
Corey et al.

(10) Patent No.: US 12,070,898 B2
(45) Date of Patent: Aug. 27, 2024

(54) ADDITIVE MANUFACTURING DEVICE WITH ACOUSTO-OPTIC DEFLECTOR AND RELATED METHODS

(71) Applicant: EAGLE TECHNOLOGY, LLC, Melbourne, FL (US)

(72) Inventors: Christopher A. Corey, Palm Bay, FL (US); Randall K. Morse, Palm Bay, FL (US); Peter A. Wasilousky, Indian Harbour Beach, FL (US); Arthur C. Paolella, Indian Harbour Beach, FL (US); Carrigan L. Braun, West Melbourne, FL (US); Catheryn D. Logan, Melbourne, FL (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 85 days.

(21) Appl. No.: 17/096,074

(22) Filed: Nov. 12, 2020

(65) Prior Publication Data

US 2022/0143905 A1    May 12, 2022

(51) Int. Cl.
*B29C 64/135* (2017.01)
*B23K 26/06* (2014.01)
(Continued)

(52) U.S. Cl.
CPC ........ *B29C 64/135* (2017.08); *B23K 26/0643* (2013.01); *B23K 26/082* (2015.10);
(Continued)

(58) Field of Classification Search
CPC ... B29C 64/135; B29C 64/153; B29C 64/255; B29C 64/268; B29C 64/286;
(Continued)

(56) References Cited

U.S. PATENT DOCUMENTS

| 5,837,962 A | 11/1998 | Overbeck |
| 6,341,029 B1 | 1/2002 | Fillion et al. |

(Continued)

FOREIGN PATENT DOCUMENTS

| DE | 102018213675 A1 * | 2/2020 | ............ B28B 1/001 |
| DE | 102018125731 | 4/2020 | |

(Continued)

OTHER PUBLICATIONS

Smason79, Gaussian-Mixture-Example, Jun. 13, 2012 (Year: 2012).*
(Continued)

*Primary Examiner* — Seyed Masoud Malekzadeh
*Assistant Examiner* — Xinwen Ye
(74) *Attorney, Agent, or Firm* — ALLEN, DYER, DOPPELT, GILCHRIST, P.A. Attorneys at Law (57) ABSTRACT

An additive manufacturing device may include a laser source configured to generate a laser beam, a build material holder configured to hold an additive build material, a controllable deflector having a first scan rate, an AOD having a second scan rate faster than the first scan rate, and a controller. The controller may be configured to control the controllable deflector and the AOD to scan the laser beam relative to the build material holder to additively manufacture a workpiece in successive layers from the additive build material.

24 Claims, 10 Drawing Sheets

(51) Int. Cl.
    *B23K 26/082* (2014.01)
    *B29C 64/153* (2017.01)
    *B29C 64/255* (2017.01)
    *B29C 64/268* (2017.01)
    *B29C 64/286* (2017.01)
    *B29C 64/393* (2017.01)
    *B33Y 10/00* (2015.01)
    *B33Y 30/00* (2015.01)
    *B33Y 50/02* (2015.01)

(52) U.S. Cl.
    CPC .......... *B29C 64/153* (2017.08); *B29C 64/255* (2017.08); *B29C 64/268* (2017.08); *B29C 64/286* (2017.08); *B29C 64/393* (2017.08); *B33Y 10/00* (2014.12); *B33Y 30/00* (2014.12); *B33Y 50/02* (2014.12)

(58) Field of Classification Search
    CPC ....... B29C 64/393; B33Y 10/00; B33Y 30/00; B33Y 50/02; B23K 26/0643; B23K 26/082
    See application file for complete search history.

(56) References Cited

U.S. PATENT DOCUMENTS

| | | | |
|---|---|---|---|
| 7,435,927 | B2 | 10/2008 | Bruland et al. |
| 8,404,998 | B2 | 3/2013 | Unrath et al. |
| 10,690,928 | B2 | 6/2020 | Karlsen et al. |
| 11,260,584 | B2 | 3/2022 | Krol et al. |
| 2010/0140237 | A1 | 6/2010 | Unrath |
| 2010/0301024 | A1 | 12/2010 | Unrath |
| 2017/0165792 | A1* | 6/2017 | Buller ................... B29C 64/214 |
| 2018/0207725 | A1 | 7/2018 | Chen et al. |
| 2018/0311760 | A1* | 11/2018 | El Naga ............... B23K 26/342 |
| 2019/0143449 | A1 | 5/2019 | Zenou |
| 2020/0132984 | A1 | 4/2020 | Tsao et al. |
| 2021/0362277 | A1* | 11/2021 | Riechel ................ B23K 26/083 |
| 2022/0168847 | A1* | 6/2022 | Kleinert ............... B23K 26/362 |

FOREIGN PATENT DOCUMENTS

| | | | | |
|---|---|---|---|---|
| KR | 101962527 | | 11/2016 | |
| WO | WO-2009087392 | A1 * | 7/2009 | .......... G02B 21/002 |
| WO | WO2010138897 | | 12/2010 | |
| WO | WO2012054927 | | 4/2012 | |
| WO | WO-2020159666 | A1 * | 8/2020 | .......... B23K 26/704 |

OTHER PUBLICATIONS

Choo et al. "Effect of laser power on defect, texture, and microstructure of a laser powder bed fusion processed 316L stainless steel" Materials and Design 164 (2019) 107534; pp. 12.

NLIGHT "Advanced Metal Processing" retreived from internet Jul. 24, 2020; pp. 7.

Romer et al., "Electro-optic and acousto-optic laser beam scanners", Elsevier, Physics Procedia, 8th International Conference on Photonic Technologies Lane, 2014, pp. 29-39.

* cited by examiner

ADDITIVE MANUFACTURING DEVICE WITH ACOUSTO-OPTIC DEFLECTOR AND RELATED METHODS

TECHNICAL FIELD

The present disclosure relates to the field of manufacturing, and, more particularly, to additive manufacturing devices and related methods.

BACKGROUND

Custom manufacturing or prototyping has typically been an expensive and labor-intensive task. Indeed, in early approaches, it was not uncommon to shave solid wood blocks to prototype and model devices. Later, some approaches included starting with solid metal ingots and machining or milling the ingot into the desired object. Again, this approach was quite labor-intensive and expensive.

With the advent of three-dimensional (3D) printing, or additive manufacturing, rapid prototyping was now possible. In this approach, thin layers of material are formed (in some types, inkjet printed) one layer at a time to complete the object. The printing process is driven by a three dimensional (3D) digital file, for example, a computer-aided design (CAD) file. In some additive manufacturing types, an optical source is used either to melt metallic or plastic powder additive build material selectively to build one layer at a time, or to cure a liquid polymer selectively to build one layer at a time. In these additive manufacturing applications, the output of the optical source is scanned over the workpiece using one or more high speed mirrors.

SUMMARY

Generally, an additive manufacturing device may include a laser source configured to generate a laser beam, a build material holder configured to hold an additive build material, at least one controllable deflector having a first scan rate, at least one acousto-optic deflector (AOD) having a second scan rate faster than the first scan rate, and a controller. The controller may be configured to control the at least one controllable deflector and the at least one AOD to scan the laser beam relative to the build material holder to additively manufacture a workpiece in successive layers from the additive build material.

The controller may be configured to control the at least one controllable deflector to define a trace of pixels on the additive build material, and while controlling the at least one AOD to define an area of subpixels within each pixel. The at least one AOD may generate a Gaussian subpixel intensity profile, and the controller may be configured to control the at least one AOD to define a flattened pixel intensity profile relative to the Gaussian subpixel intensity profile.

In some embodiments, the at least one AOD may have a controllable output intensity, and the controller may be configured to control the output intensity of the at least one AOD. The at least one AOD may comprise first and second AODs arranged to operate at orthogonal angles.

Additionally, the controller may comprise control circuitry, and RF drive circuitry coupled between the control circuitry and the at least one AOD. The at least one controllable deflector may comprise at least one movable mirror. For example, the additive material holder may be configured to hold a metallic powder additive build material, a powder additive build material, or a liquid additive build material.

Another aspect is directed to an additive manufacturing device comprising a laser source configured to generate a laser beam, a build material holder configured to hold an additive build material, and a pair of controllable deflectors, each having a first scan rate. The additive manufacturing device also includes a pair of AODs, each having a second scan rate faster than the first scan rate. The additive manufacturing device also includes a controller configured to control the pair of controllable deflectors and the pair of AODs to scan the laser beam relative to the build material holder to additively manufacture a workpiece in successive layers from the additive build material. The controller may be configured to control the pair of controllable deflectors to define a trace of pixels on the additive build material, and while controlling the pair of AODs, to define an area of subpixels within each pixel.

Another aspect is directed to an additive manufacturing method. The method may include operating a laser source to generate a laser beam directed towards a build material holder holding an additive build material, and operating a controller to control at least one controllable deflector and at least one AOD to scan the laser beam relative to the build material holder to additively manufacture a workpiece in successive layers from the additive build material. The at least one controllable deflector may have a first scan rate, and the at least one AOD may have a second scan rate faster than the first scan rate.

Another aspect is directed to an additive manufacturing device comprising a laser source configured to generate a laser beam, a build material holder configured to hold an additive build material, and first and second controllable deflectors coupled sequentially in a series and having a first scan rate. The additive manufacturing device also includes first and second AODs arranged to operate at orthogonal angles and coupled sequentially in a series upstream from the first and second controllable deflectors, each AOD having a second scan rate faster than the first scan rate. The additive manufacturing device further comprises a controller configured to control the first and second controllable deflectors and the first and second AODs to scan the laser beam relative to the build material holder to additively manufacture a workpiece in successive layers from the additive build material. The controller is configured to control the first and second controllable deflectors to define a scanline trace of pixels on the additive build material, and while controlling the first and second AODs to define a respective subpixel pattern within each pixel so that a given pixel has a flattened pixel intensity profile from summation of multiple iterations of a Gaussian subpixel intensity profile. The scanline trace of pixels on the additive build material is configured to have different subpixel lasing patterns within adjacent pixels, and the respective subpixel pattern within each pixel being offset from the scanline trace of pixels. For example, the controller may be configured to control the first and second controllable deflectors to define a raster scanline trace of pixels on the additive build material.

DETAILED DESCRIPTION

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout, and base 100 reference numerals are used to indicate similar elements in alternative embodiments.

Figure 1:
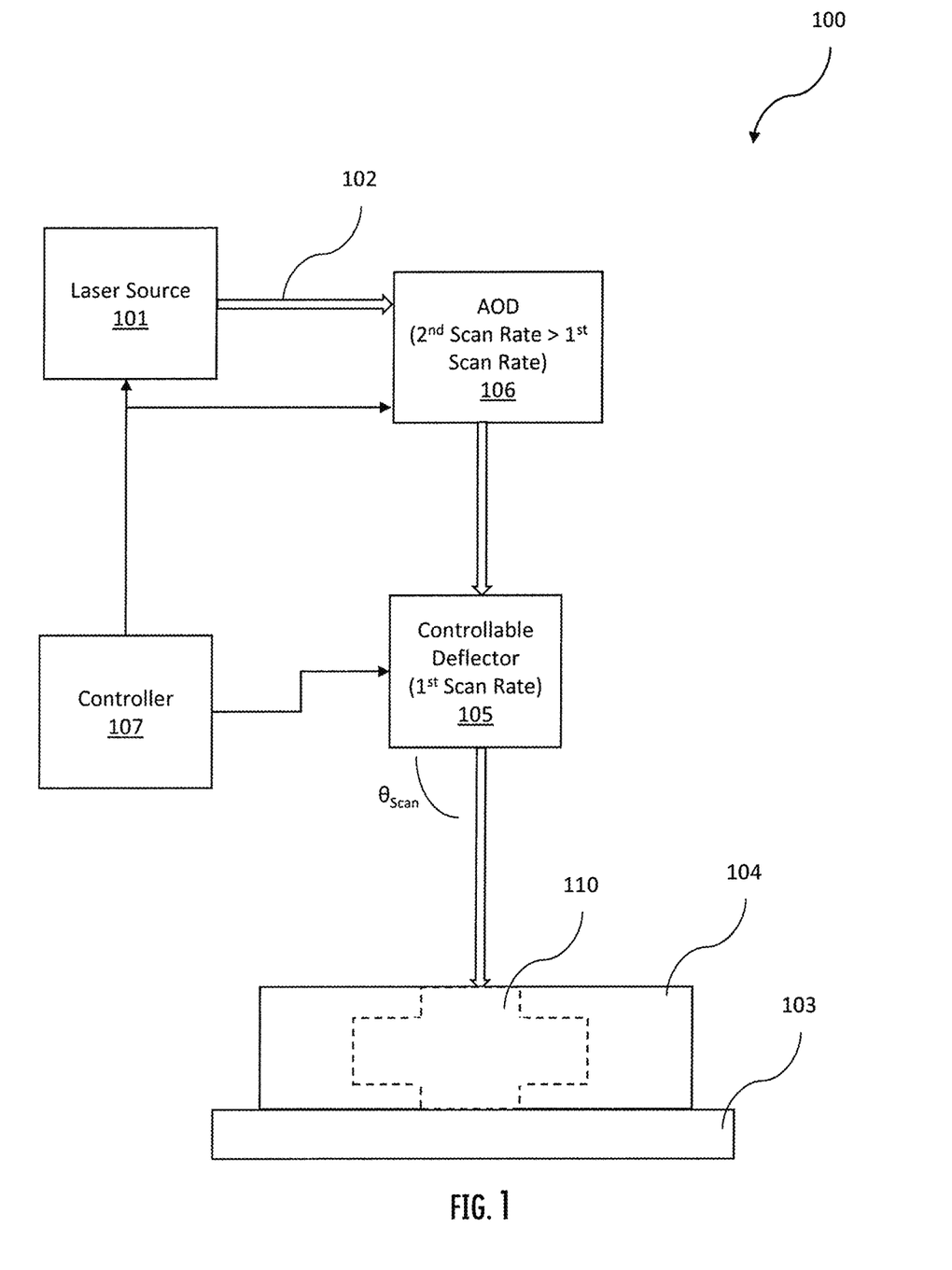
FIG. 1 is a schematic diagram of a first example embodiment of an additive manufacturing device, according to the present disclosure.
Figure 2:
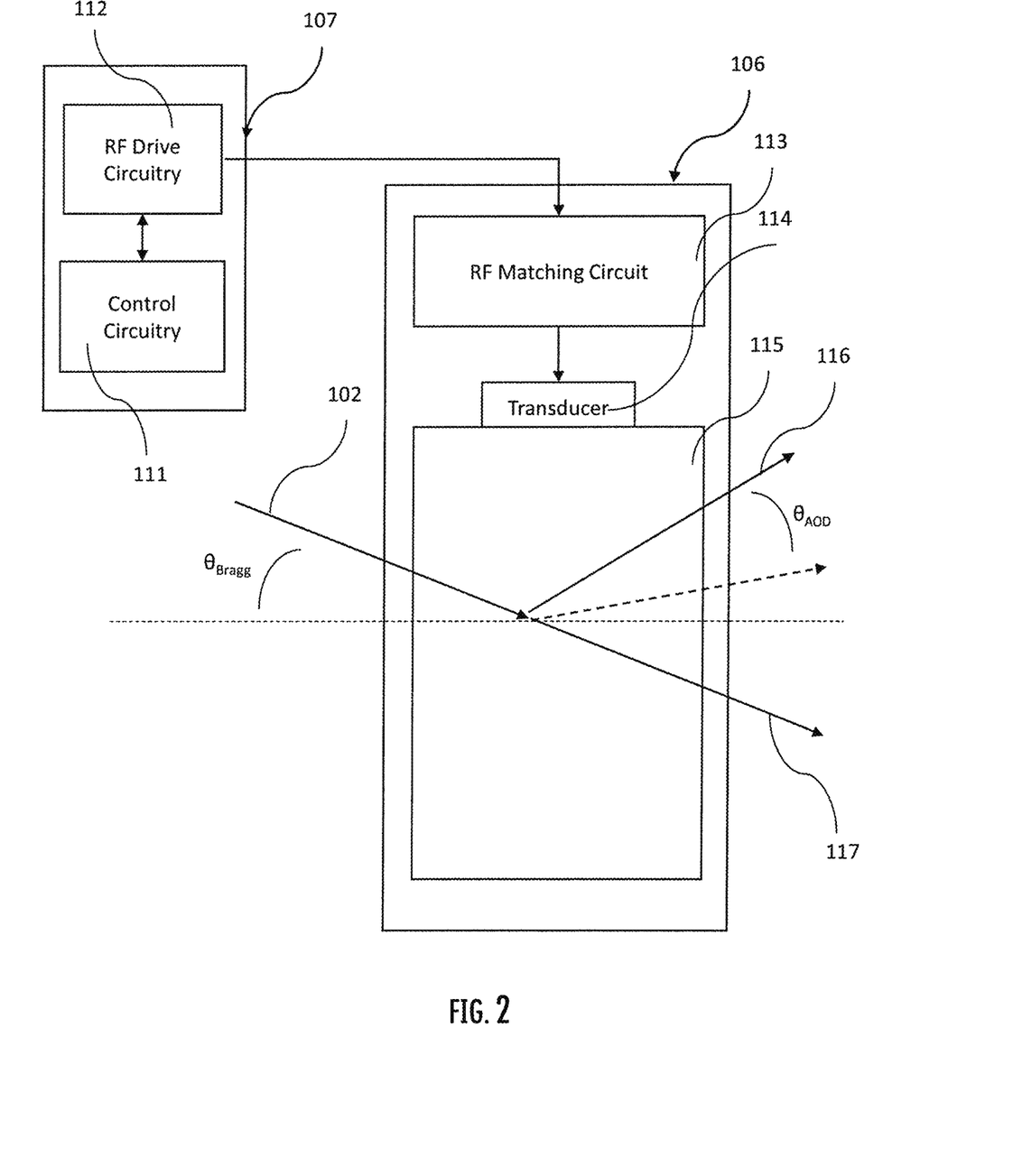
FIG. 2 is a schematic diagram of the controller and the AOD from the additive manufacturing device of FIG. 1.

Referring initially to FIGS. 1-2, an additive manufacturing device 100 according to the present disclosure is now described. The additive manufacturing device 100 illustratively includes a laser source 101 configured to generate a laser beam 102, and a build material holder 103 configured to hold an additive build material 104. For example, the build material holder 103 is configured to hold one of a metallic powder additive build material (e.g. powder bed fusion or direct energy deposition additive manufacturing device), a polymer powder additive build material (e.g. powder bed fusion or direct energy deposition additive manufacturing device), or a polymer liquid additive build material (e.g. photopolymerization additive manufacturing device) as will be appreciated by those skilled in the art. Of course, other additive non-polymer build materials may be used.

The additive manufacturing device 100 illustratively includes a controllable deflector 105 having a first scan rate. The controllable deflector 105 may comprise a movable mirror, for example, a Galvanometric mirror. The additive manufacturing device 100 illustratively includes an AOD 106 coupled upstream of the controllable deflector 105 and having a second scan rate faster than the first scan rate. It should be appreciated that some embodiments have more than one controllable deflector 105 and one AOD 106 (See, e.g., FIG. 3) as described below.

The additive manufacturing device 100 illustratively includes a controller 107 configured to control the controllable deflector 105 and the AOD 106 to scan the laser beam 102 relative to the build material holder 103 to additively manufacture a workpiece 110 in successive layers from the additive build material. The controller 107 is configured to control the controllable deflector 105 to define a trace of pixels on the additive build material, and while controlling the AOD 106, to define an area of subpixels within each pixel. As will be appreciated, the scan method for the laser beam 102 may comprise raster scan method, for example. Helpfully, the controller 107 is configured to control the controllable deflector 105 and the AOD 106 to scan the laser beam 102 at a rate of an order of MHz, which is substantially faster than typical Galvanometric approaches.

As perhaps best seen in FIG. 2, the controller 107 comprises control circuitry 111, and RF drive circuitry 112 coupled between the control circuitry and the AOD 106. The AOD 106 illustratively comprises an RF matching circuit 113 configured to receive an RF signal from the RF drive circuitry 112, a transducer 114 receiving an output of the RF matching circuit and generating acoustic waves, and an acousto-optic bulk medium 115 coupled to the transducer and receiving the acoustic waves. As will be appreciated, the acousto-optic bulk medium 115 changes based upon the operational wavelength of the laser beam 102. For example, when the operational wavelength of the laser beam 102 is 355 nm, the acousto-optic bulk medium 115 may comprise quartz; when the operational wavelength of the laser beam 102 is 532 nm, the acousto-optic bulk medium 115 may comprise tellurium dioxide; and when the operational wavelength of the laser beam 102 is 10 µm, the acousto-optic bulk medium 115 may comprise germanium.

In the illustrated embodiment, the AOD 106 has a controllable output intensity, and the controller 107 is configured to control the output intensity of the AOD. In particular, the AOD 106 divides the laser beam 102 (incident at an angle of $\theta_{BRAGG}$) from the laser source 101 into a first order scan beam 116, and a zero order dump beam 117. The AOD 106 is configured to selectively refract the laser beam 102 at an angle of $\theta_{AOD}$ (i.e. the scan angle).

The controller 107 is configured to attenuate the amplitude of the first order scan beam 116, and the zero order dump beam 117. Since the first order scan beam 116 is passed to the controllable deflector 105 and eventually to the workpiece 110, the controller 107 is capable of selectively adjusting the intensity, amplitude, and power of the laser beam imparted on the workpiece.

Yet another aspect is directed to an additive manufacturing method. The method includes operating a laser source 101 to generate a laser beam 102 directed towards a build material holder 103 holding an additive build material 104, and operating a controller 107 to control a controllable deflector 105 and an AOD 106 to scan the laser beam relative to the build material holder to additively manufacture a workpiece 110 in successive layers from the additive build material. The controllable deflector 105 has have a first scan rate and the AOD 106 has a second scan rate faster than the first scan rate.

Figure 3:
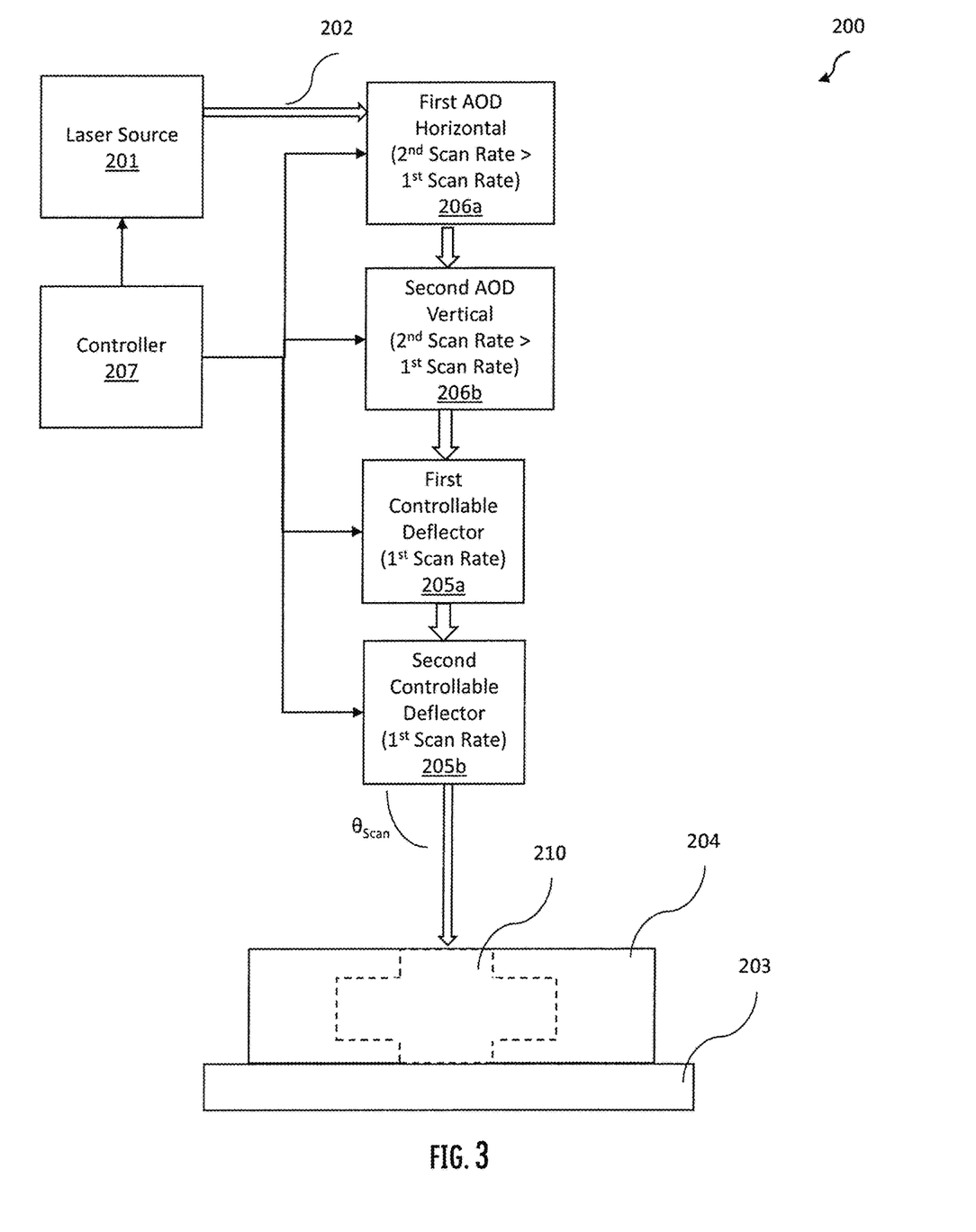
FIG. 3 is a schematic diagram of a second example embodiment of the additive manufacturing device, according to the present disclosure.

Referring now additionally to FIG. 3, another embodiment of the additive manufacturing device 200 is now described. In this embodiment of the additive manufacturing device 200, those elements already discussed above with respect to FIGS. 1-2 are incremented by 100 and most require no further discussion herein. This embodiment differs from the previous embodiment in that this additive manufacturing device 200 illustratively includes a laser source 201 configured to generate a laser beam 202, a build material holder 203 configured to hold an additive build material 204, and a pair of controllable deflectors 205a-205b coupled sequentially (i.e. in series). Each controllable deflector 205a-205b has a first scan rate.

The additive manufacturing device 200 illustratively includes a pair of AODs 206a-206b coupled sequentially upstream of the pair of controllable deflectors 205a-205b. It should be appreciated that imaging optics having a suitable magnification ratio can be introduced between the pair of AODs 206a-206b and between the pair of controllable deflectors 205a-205b to define the size of the scanned sub-pixel Gaussian beam intensity profile at the work surface when projected through a suitable F-Theta lens. The resolution of the additive manufacturing device 200 in many cases is increased by the magnification ratio and the non-raster scan capability of pair of AODs 206a-206b. They provide a means to distribute the same level of fluence across the entire work area in the same amount of time at much higher resolution when used in conjunction with the pair of controllable deflectors 205a-205b.

Each AOD 206a-206b has a second scan rate faster than the first scan rate. The additive manufacturing device 200 illustratively includes a controller 207 configured to control the pair of controllable deflectors 205a-205b and the pair of AODs 206a-206b to scan the laser beam 202 relative to the build material holder 203 to additively manufacture a workpiece 210 in successive layers from the additive build material 204.

The controller 207 is configured to control the pair of controllable deflectors 205a-205b to define a trace of pixels on the additive build material 204, and while controlling the pair of AODs 206a-206b, to define an area of subpixels within each pixel. The pair of AODs 206a-206b comprises first and second AODs arranged to operate at orthogonal angles (i.e. horizontal and vertical scan).

In some embodiments, the pair of AODs 206a-206b is carried modularly in a separate housing (i.e. separate from downstream and upstream optical components). In these embodiments, the pair of AODs 206a-206b may be readily installed in the optical chain of additive manufacturing devices for upgrading the resolution and speed thereof.

Figure 4A:
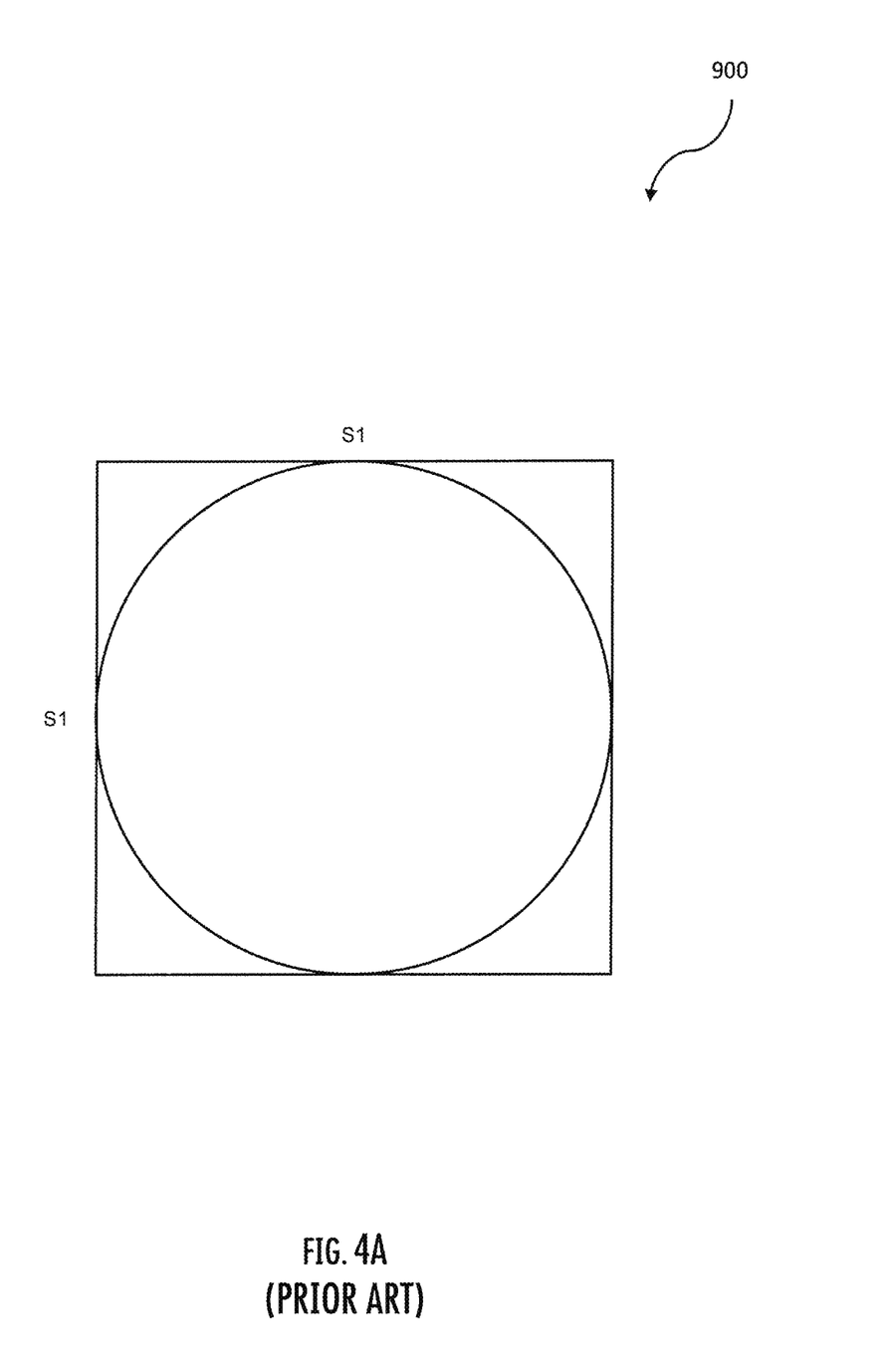
FIG. 4A is a schematic diagram of a scanned pixel within an additive manufacturing device, according to the prior art.
Figure 4B:
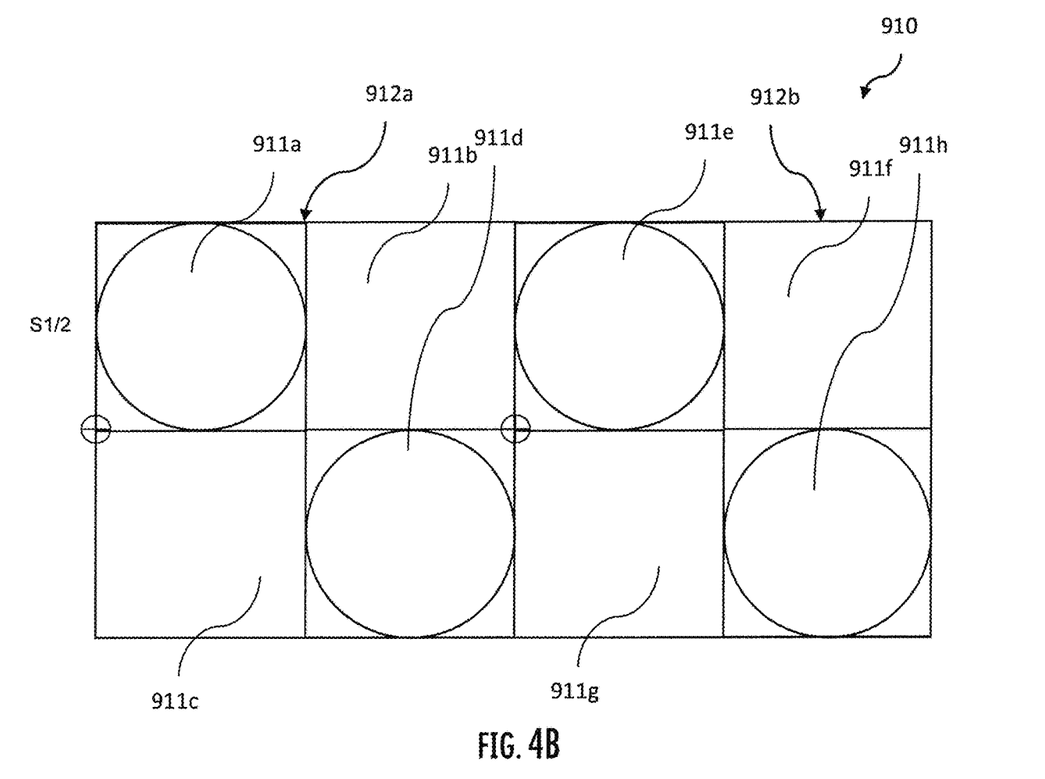
FIG. 4B is a schematic diagram of scanned pixels and subpixels within the additive manufacturing device, according to the present disclosure.
Figure 4C:
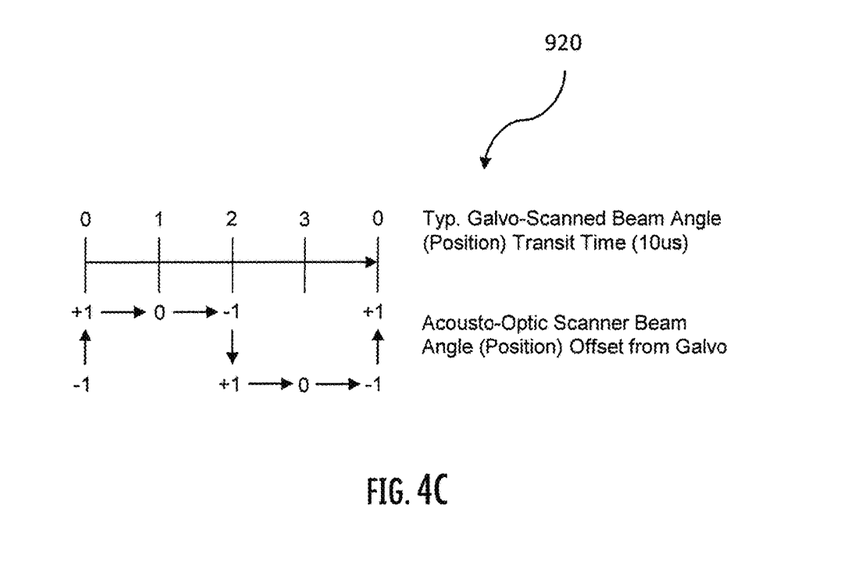
FIG. 4C is a timing diagram of the scanning within the additive manufacturing device, according to the present disclosure.

Referring now additionally to FIGS. 4A-4C, a diagram 900 shows a scan pixel from a typical additive manufacturing device. In other words, diagram 900 shows the dimensions of the laser beam in the typical additive manufacturing device. Here, the pixel covers an area of S1*S1 (e.g. 100 μm×100 μm).

To demonstrate the ability of the additive manufacturing device 200 to increase the resolution of a typical additive manufacturing device without incurring a corresponding increase in the build time, the fluence equals time integrated flux (J/cm^2). It is assumed for convenience that the scan beam profile is such that the beam intensity is uniform across the beam sub-pixel area. Then, Formula 1 gives the Fluence=Intensity*Integration or Dwell Time at any position along the scan direction where $P_o$ is the laser beam power at the work surface, and $v_1$ is the typical additive manufacturing linear beam scan velocity produced by the pair of controllable deflectors 205a-205b.

$$\frac{P_o}{S1^2} \cdot \frac{S_1}{v_1} \quad (1)$$

By way of example, the features afforded by the additive manufacturing device 200 is now described. A diagram 910 shows a pair of adjacent pixels 912a-912b. Each pixel 912a-912b now comprises a set of four subpixels 911a-911d, 911e-911h, effectively increasing the laser scanning resolution by a factor of 4. The laser beam 102, 202 lases a subset of the subpixels 911a, 911d, 911e, 911h at the work surface. Here, each subpixel 911a-911d, 911e-911h covers an area of S1/2*S1/2 (e.g. 50 μm×50 μm). Formula 2 shows the raster scanned fluence along the scan direction produced without the use of pre-scan pair of AODs 206a-206b is:

$$\frac{4 \cdot P_o}{S1^2} \cdot \frac{S_1}{2 \cdot v_1} \quad (2)$$

It can be seen that without the use of AOD pre-scan elements (i.e. the pair of AODs 206a-206b), the linear scan velocity would have to increase by a factor of 2 for each subpixel to maintain the same fluence level. In order to complete the entire work layer at the higher indicated subpixel resolution in the same amount of time required at the original pixel resolution and fluence level, the raster scan velocity requires an increase by a factor equal to the increase in scanning beam resolution or ratio of the pixel to subpixel dimension. As the increase in write beam resolution approaches an order of magnitude, it can be seen that the linear scan velocity demands imposed on mechanical raster scanning elements, as embodied in the pair of controllable deflectors 205a-205b, rapidly become untenable. Finally, because fluence imparted to a localized "pixel" region using raster scanning alone involves a convolution of the shape of the write beam with the desired localized area, the fluence profile is determined solely by the write beam power and transition time of the write beam across a spatial region.

With the capability provided by the pre-scan AOD elements 206a-206b to change, in a non-raster scan fashion, the angle of the beam directed to the raster scan pair of controllable deflectors 205a-205b at an update rate comparable to the subpixel scan time, the write beam may be positioned at a nearly stationary location within a pixel region to localize the fluence produced by the subpixel write beam. Diagram 920 shows the position of the laser beam 102 at the work surface, where the subpixel beam position is constantly updated in relation to a raster scanned Galvanometric deflector to produce the desired local fluence without sacrificing the total scan build time. In the example shown in Diagram 920, the initial beam offset from the current Galvanometric mirror beam angle position may be positive by one subpixel, and continuously updated to be directed to one subpixel in a direction opposite to the current raster scan Galvanometric mirror position. In addition, the AOD scan elements 206a-206b may direct the beam position to a new location within the original pixel region in a non-raster scanned fashion. Whereas, the increase in resolution afforded by the manufacturing device 200, as determined by the number of subpixels within a pixel region, which may be on the order of N^2, the number of resolvable angular positions produced by the AOD scan elements 206a-206b within the angle extent of the pixel region must be comparable. The requirements to meet this condition are given approximately by the Time-Bandwidth product of the respective AOD deflectors. It should be noted that this condition, along with the necessary update rate, is normally within the capability of this class of deflectors.

Figure 5:
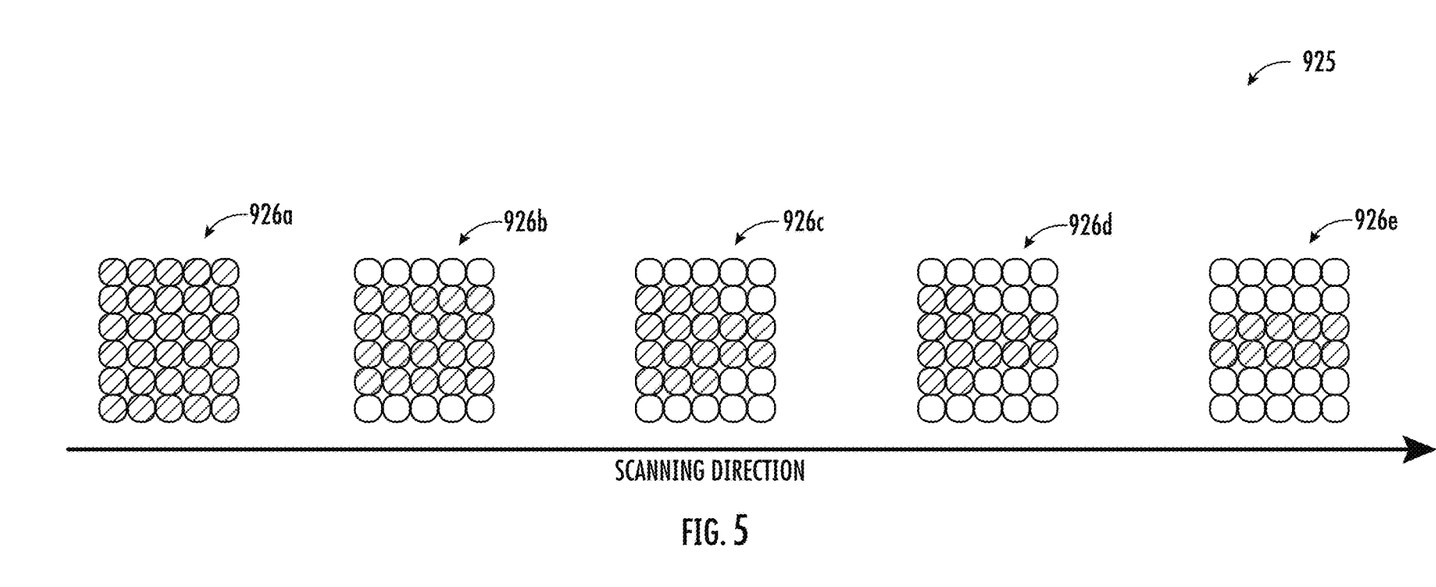
FIG. 5 is a schematic diagram of a raster line of scanned pixels and subpixels within the additive manufacturing device, according to the present disclosure.
Figure 6:
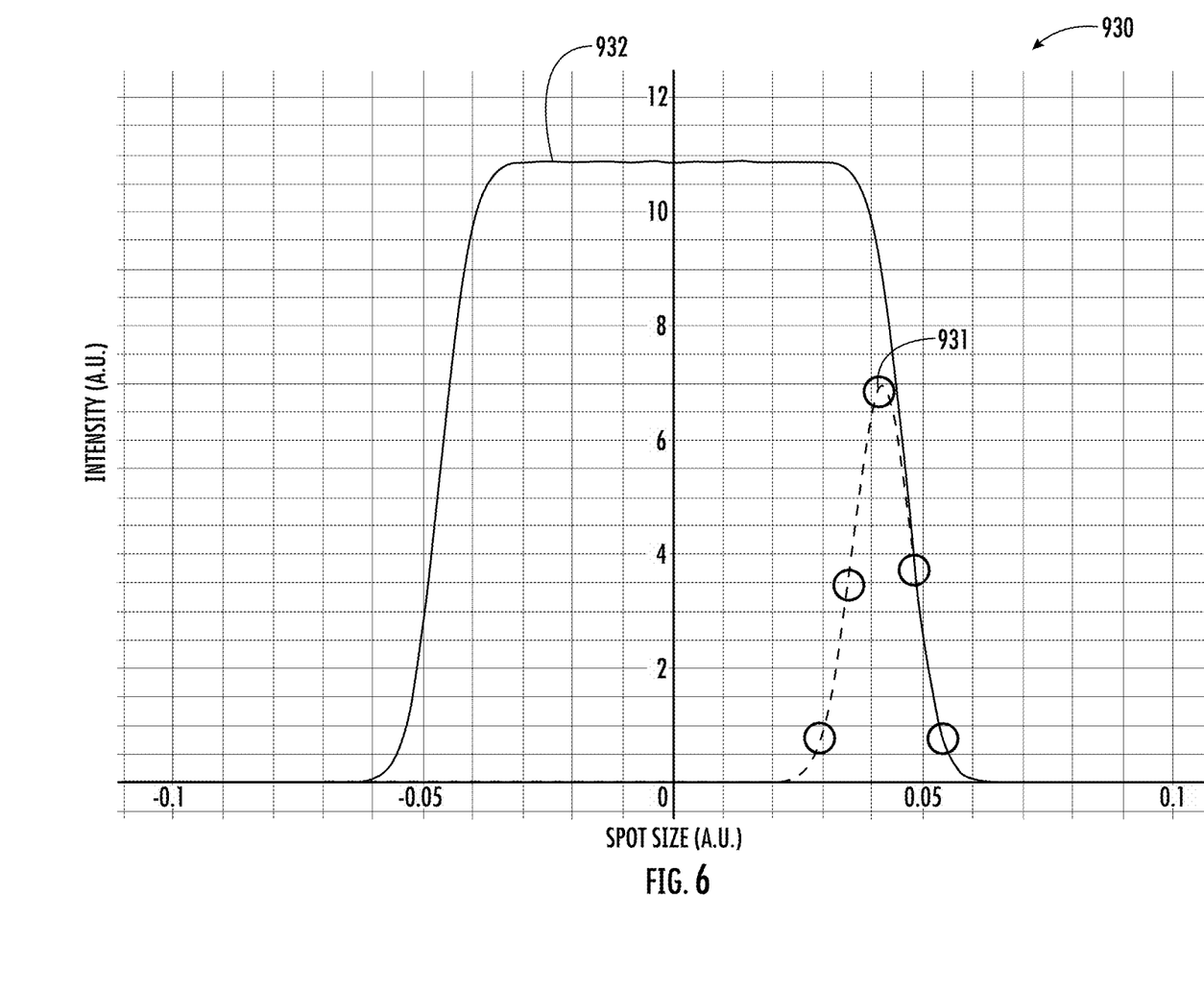
FIG. 6 is a diagram of an intensity profile for the laser beam within the additive manufacturing device, according to the present disclosure.
Figure 7A:
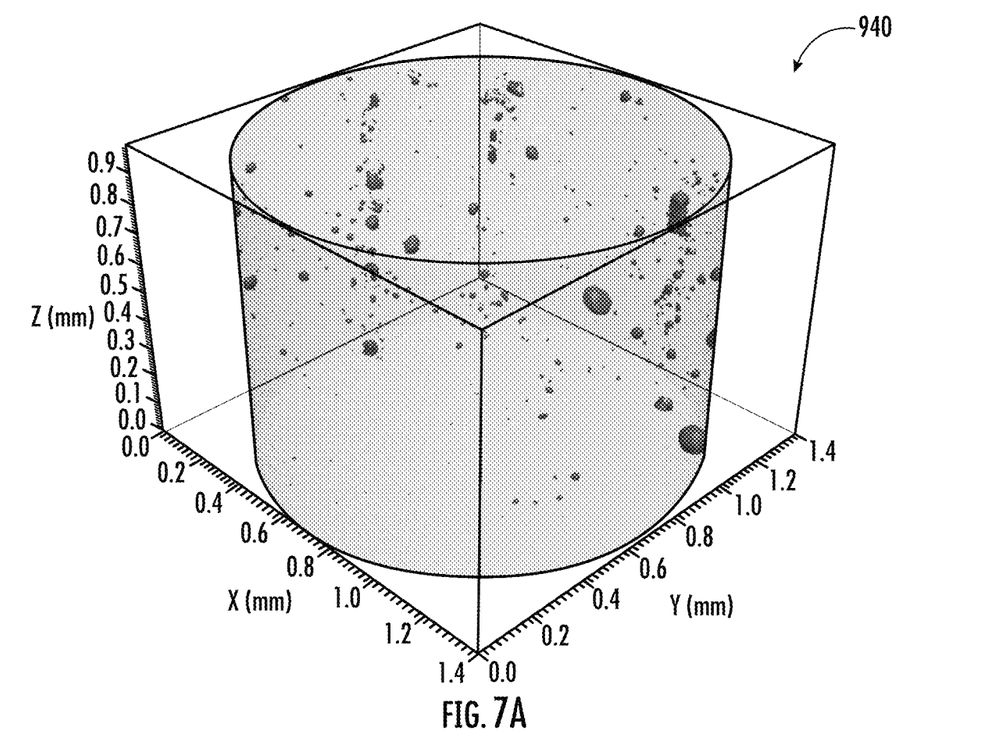
FIGS. 7A and 7B are a computerized tomography (CT) scan and a sectional diagram, respectively, of a workpiece from the additive manufacturing device, according to the present disclosure, at high power.
Figure 7B:
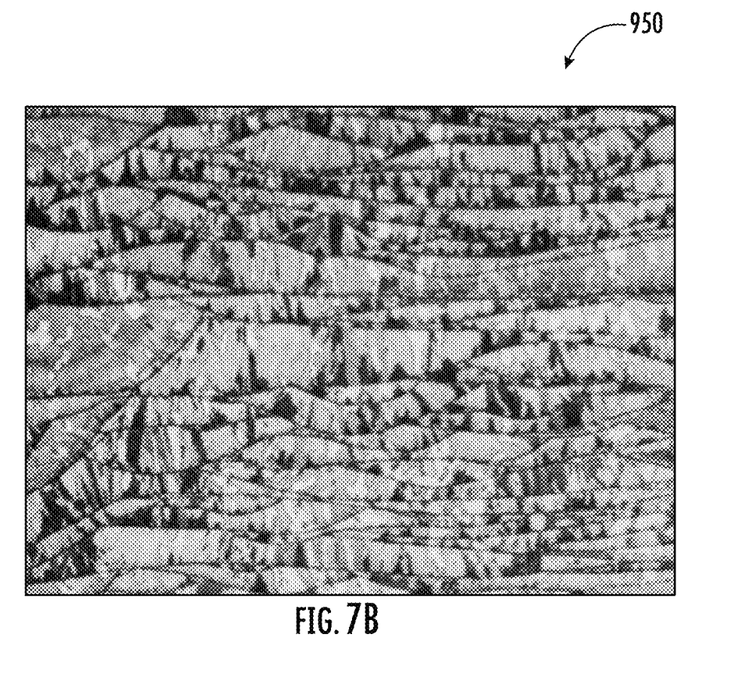
Figure 8A:
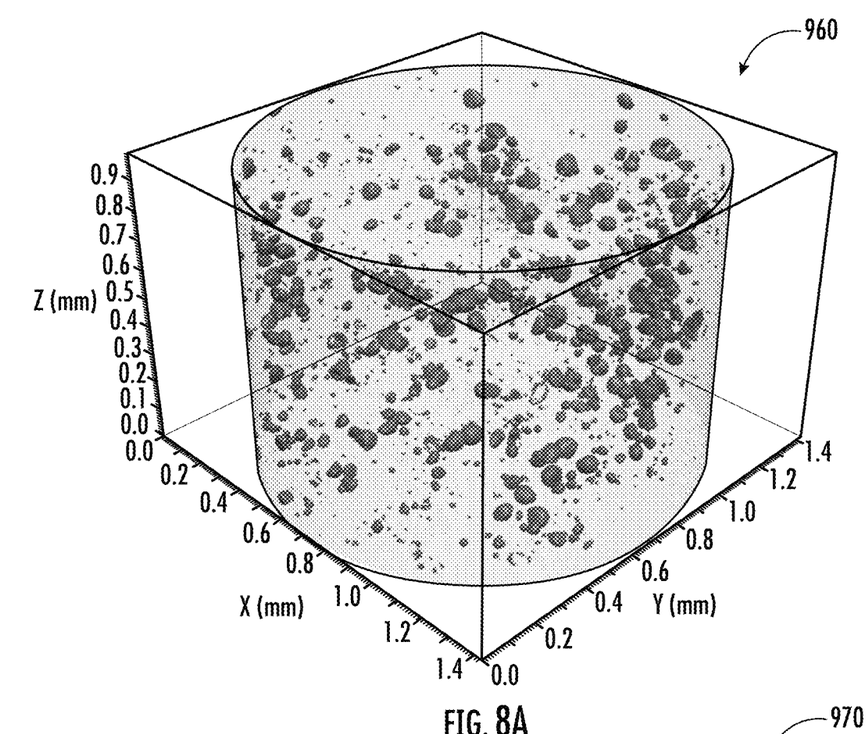
FIGS. 8A and 8B are a CT scan and a sectional diagram, respectively, of another workpiece from the additive manufacturing device, according to the present disclosure, at low power.
Figure 8B:
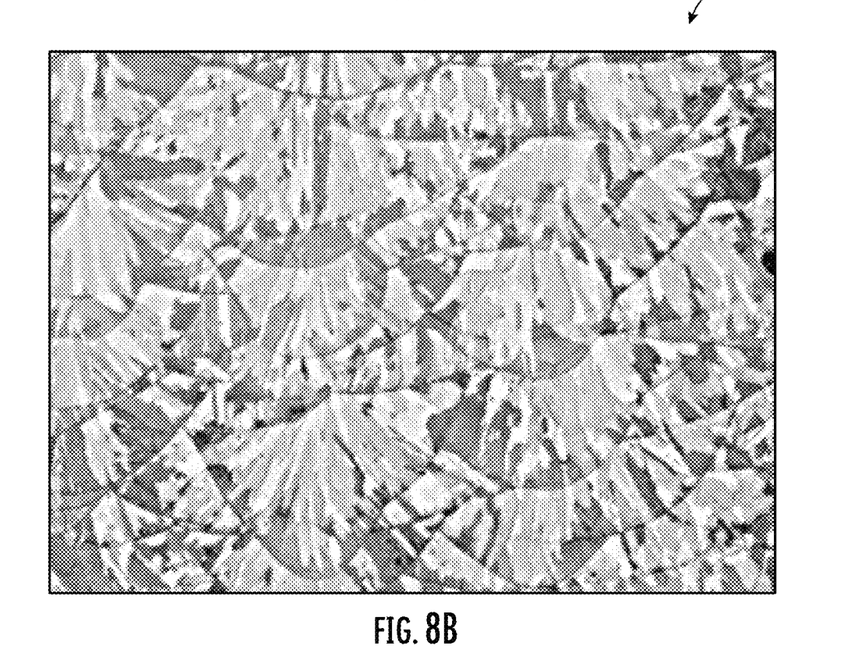
Figure 9:
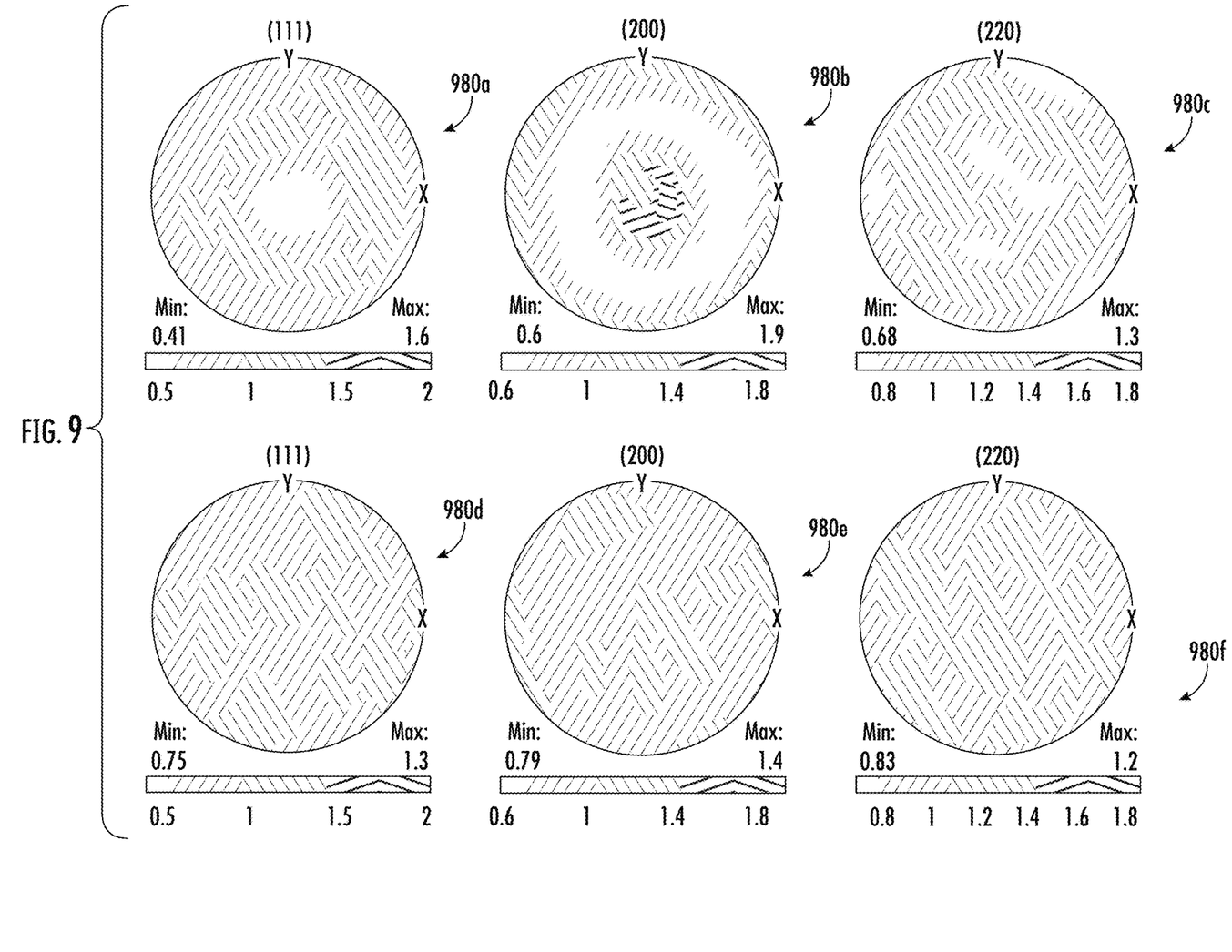
FIG. 9 is a diagram of thermal graphs of laser beam intensity from the additive manufacturing device, according to the present disclosure.

Diagram 925 shows a single horizontal raster scan of pixels 926a-926e. Each pixel 926a-926e comprises a set of 30 subpixels, and the laser beam 102 lases a selective subset of the subpixels as it completes the horizontal raster scan. In particular, the laser beam 102 lases a decreasing subset of subpixels as it completes the horizontal raster scan from left to right. Of course, this illustrative depiction is merely exemplary, and any pattern of subpixel lasing is potential possible between adjacent pixels 926a-926e.

Referring now to FIGS. 1-3 and 6, a diagram 930 shows an intensity profile for the laser beam 102, 202 in the additive manufacturing device 100, 200. The AOD 106, 106a-106b generates a Gaussian subpixel intensity profile 931 at the work surface, and the controller 107, 207 is configured to control the AOD to define the fluence delivered to a flattened pixel intensity profile 932 relative to the Gaussian subpixel intensity profile. The flattened pixel intensity profile 932 is formed via arbitrary beam forming. In particular, the flattened pixel intensity profile 932 is formed through the summation of multiple iterations of the Gaussian subpixel intensity profile 931 over time. Since the laser beam 102, 202 can move significantly faster and with greater resolution at the subpixel level, the flattened pixel intensity profile 932 can be achieved for the pixel level event.

Referring now to FIGS. 1-3 and 7A-8B, & 9, diagrams 940, 950, 960, 970, 980a-980f show how the selective intensity profile for the laser beam 102, 202 in the additive manufacturing device 100, 200 can be used to create localized changes in the workpiece 110, 210. (See Choo et al., "Effect of laser power on defect, texture, and microstructure of a laser powder bed fusion processed 316L stainless steel", Materials and Design 164 (2019) 107534, the contents of which are hereby incorporated by reference in their entirety). For example, diagrams 940, 950 show the hardness and porosity of the lased portion of the workpiece 110, 210 at a high power level, and diagrams 960, 970 show the hardness and porosity of the lased portion of the workpiece at a low power level. By attenuating the power level of the laser beam 102, 202, the additive manufacturing device 100, 200 is able to selectively generate the workpiece 110, 210 at the pixel level with set hardness and porosity. To this end, diagrams 980a-980f show varying intensity profiles for different pixels in the workpiece 110, 210 using the additive manufacturing device 100, 200.

In typical additive manufacturing devices, there is a tradeoff between fabrication speed and manufacturing resolution. In other words, the higher the resolution, the slower the manufacture process. In typical approaches, attempts to improve speed by increasing laser beam fluence have been disclosed, but they are limited by the Gaussian profile of the beam intensity (i.e. the peripheral edges of the laser spot on the workpiece do not receive sufficient energy or are inadvertently cured, providing cross-curing issues). Moreover, these high powered approaches may experience cure-through issues (i.e. inadvertently curing underneath portions of the workpiece). Some approaches to speeding up manufacture have deployed multiple laser beams, but this at the detriment of greater complexity and cost to build.

With the additive manufacturing device 100, 200 disclosed herein, such a design tradeoff is avoided by using fast AODs 106, 206a-206b rather than the typical Galvanometric mirrors and field lenses. It should be appreciated that some embodiments would still include Galvanometric mirrors and an f-theta lens to have any reasonably large build envelope. In particular, the embodiment of the additive manufacturing device 200 in FIG. 3 uses a pair of orthogonal AODs 206a-206b upstream of the second controllable deflector 205b (e.g. scanning mirrors) to form arbitrary beam profiles in near real-time. The pair of orthogonal AODs 206a-206b each has a scanning rate orders of magnitude faster than mechanical scanning systems. By scanning over an array of subpixels, the additive manufacturing device 200 can create arbitrary net beam profiles on the time-scale of the mechanical scanning element. Also, the additive manufacturing device 200 allows for a large beam when performing bulk scanning, and a finer beam when detailing edges, providing greater manufacturing flexibility. Moreover, it should be appreciated that the features of the additive manufacturing device 100, 200 can be retrofitted onto existing additive manufacturing devices to enhance resolution and speed of manufacturing.

Advantageously, the additive manufacturing device 100, 200 disclosed herein provides the ability to adjust beam intensity during a scan, which has a significantly positive impact on final part properties. The inherent speed of AODs 106, 206a-206b allows adjustment without modulating laser, which allows the laser to run in its highest efficiency output mode. Also, the flattened pixel intensity profile 932 in the additive manufacturing device 100, 200 may reduce cross-curing issues.

Moreover, the ability to change the beam shape relative to the direction of scan travel may have a significant impact on the microstructure of metal workpieces. Currently, modification of beam shape is achieved using anamorphic optics, which are not able to be adjusted during build. In other words, the additive manufacturing device 100, 200 disclosed herein can beam shape on the fly and in real-time.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

That which is claimed is:

1. An additive manufacturing device comprising:
a laser source configured to generate a laser beam;
a build material holder configured to hold an additive build material;
first and second controllable deflectors coupled sequentially in a series and having a first scan rate;
first and second acousto-optic deflectors (AODs) arranged to operate at orthogonal angles and coupled sequentially in a series upstream from the first and second controllable deflectors, each AOD having a second scan rate faster than the first scan rate; and
a controller configured to
control the first and second controllable deflectors and the first and second AODs to scan the laser beam relative to the build material holder to additively manufacture a workpiece in successive layers from the additive build material, and
control the first and second controllable deflectors to define a scanline trace of pixels on the additive build material, and while controlling the first and second AODs to define a respective subpixel pattern within each pixel so that a given pixel has a flattened pixel intensity profile from summation of multiple iterations of a Gaussian subpixel intensity profile,
the scanline trace of pixels on the additive build material configured to have
different subpixel lasing patterns within adjacent pixels, and
the respective subpixel pattern within each pixel being offset from the scanline trace of pixels.

2. The additive manufacturing device of claim 1 wherein the first and second AODs have a controllable output intensity; and wherein the controller is configured to control the controllable output intensity of the first and second AODs.

3. The additive manufacturing device of claim 1 wherein the controller comprises control circuitry, and radio frequency (RF) drive circuitry coupled between the control circuitry and the first and second AODs.

4. The additive manufacturing device of claim 1 wherein each of the first and second controllable deflectors comprises at least one movable mirror.

5. The additive manufacturing device of claim 1 wherein the build material holder is configured to hold a metallic powder additive build material.

6. The additive manufacturing device of claim 1 wherein the build material holder is configured to hold a powder additive build material.

7. The additive manufacturing device of claim 1 wherein the build material holder is configured to hold a liquid additive build material.

8. The additive manufacturing device of claim 1 wherein the controller is configured to control the first and second controllable deflectors to define a raster scanline trace of pixels on the additive build material.

9. The additive manufacturing device of claim 1 wherein the controller is configured to control the first and second AODs to divide the laser beam into a first order scan beam, and a zero order dump beam; and wherein the controller is configured to attenuate the first order scan beam and the zero order dump beam.

10. The additive manufacturing device of claim 1 wherein the respective subpixel pattern within each pixel is updated in a direction opposite to a current scan.

11. An additive manufacturing device comprising:
a laser source configured to generate a laser beam;
a build material holder configured to hold an additive build material;
a pair of controllable deflectors coupled sequentially in a series, each controllable deflector having a first scan rate;
a pair of acousto-optic deflectors (AODs) arranged to operate at orthogonal angles and coupled sequentially in a series upstream from the pair of controllable deflectors, each AOD having a second scan rate faster than the first scan rate; and
a controller configured to
control the pair of controllable deflectors and the pair of AODs to scan the laser beam relative to the build material holder to additively manufacture a workpiece in successive layers from the additive build material, and
control the pair of controllable deflectors to define a raster scanline trace of pixels on the additive build material, and while controlling the pair of AODs, to define a respective subpixel pattern within each pixel so that a given pixel has a flattened pixel intensity profile from summation of multiple iterations of a Gaussian subpixel intensity profile,
the raster scanline trace of pixels on the additive build material configured to have
different subpixel lasing patterns within adjacent pixels, and
the respective subpixel pattern within each pixel being offset from the raster scanline trace of pixels.

12. The additive manufacturing device of claim 11 wherein each AOD has a controllable output intensity; and wherein the controller is configured to control the controllable output intensity of the pair of AODs.

13. The additive manufacturing device of claim 11 wherein the controller comprises control circuitry, and radio frequency (RF) drive circuitry coupled between the control circuitry and the pair of AODs.

14. The additive manufacturing device of claim 11 wherein each controllable deflector comprises a movable mirror.

15. The additive manufacturing device of claim 11 wherein the build material holder is configured to hold a metallic powder additive build material.

16. The additive manufacturing device of claim 11 wherein the build material holder is configured to hold a powder additive build material.

17. The additive manufacturing device of claim 11 wherein the build material holder is configured to hold a liquid additive build material.

18. The additive manufacturing device of claim 11 wherein the controller is configured to control the pair of AODs to divide the laser beam into a first order scan beam, and a zero order dump beam; and wherein the controller is configured to attenuate the first order scan beam and the zero order dump beam.

19. An additive manufacturing method comprising:
operating a laser source to generate a laser beam directed towards a build material holder holding an additive build material; and
operating a controller to
control first and second controllable deflectors coupled sequentially in a series and first and second acousto-optic deflectors (AODs) being arranged to operate at orthogonal angles and coupled sequentially in a series upstream from the first and second controllable deflectors,
the first and second controllable deflectors and the first and second AODs to scan the laser beam relative to the build material holder to additively manufacture a workpiece in successive layers from the additive build material, the first and second controllable deflectors having a first scan rate and the first and second AODs having a second scan rate faster than the first scan rate, and
control the first and second controllable deflectors to define a scanline trace of pixels on the additive build material, and while controlling the first and second AODs to define a respective subpixel pattern within each pixel so that a given pixel has a flattened pixel intensity profile from summation of multiple iterations of a Gaussian subpixel intensity profile,
the scanline trace of pixels on the additive build material configured to have
different subpixel lasing patterns within adjacent pixels, and
the respective subpixel pattern within each pixel being offset from the scanline trace of pixels.

20. The method of claim 19 wherein the first and second AODs each has a controllable output intensity; and wherein operating the controller comprises operating the controller to control the controllable output intensity of the first and second AODs.

21. The method of claim 19 wherein the build material holder holds a metallic powder additive build material.

22. The method of claim 19 wherein the build material holder is configured to hold a powder additive build material.

23. The method of claim 19 wherein the build material holder holds a liquid additive build material.

24. The method of claim 19 further comprising operating the controller to control the first and second AODs to divide the laser beam into a first order scan beam, and a zero order dump beam, and to attenuate the first order scan beam and the zero order dump beam.

* * * * *